L. MARTIN.
MACHINE FOR EXTERMINATING NOXIOUS GRASSES.
No. 186,684. Patented Jan. 30, 1877.
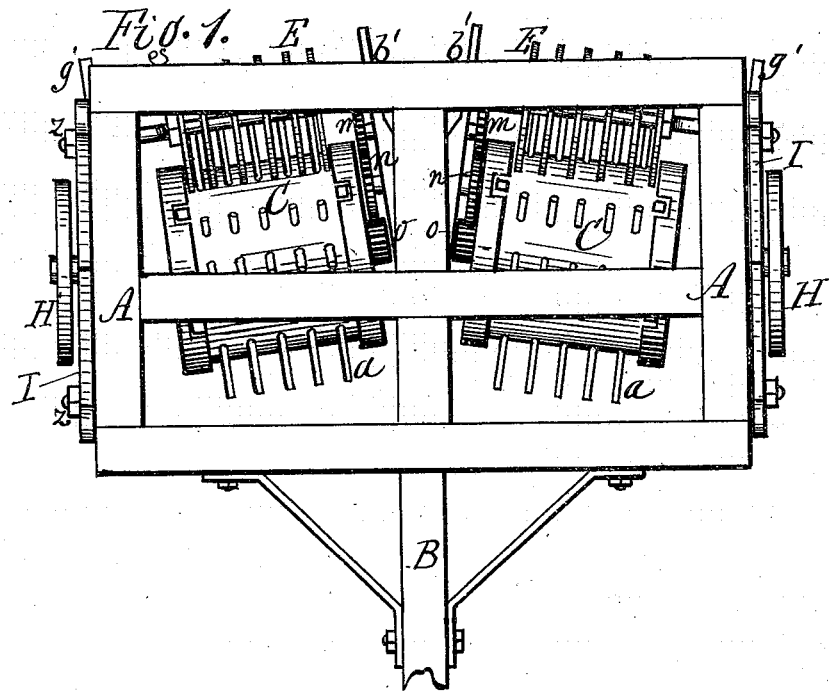
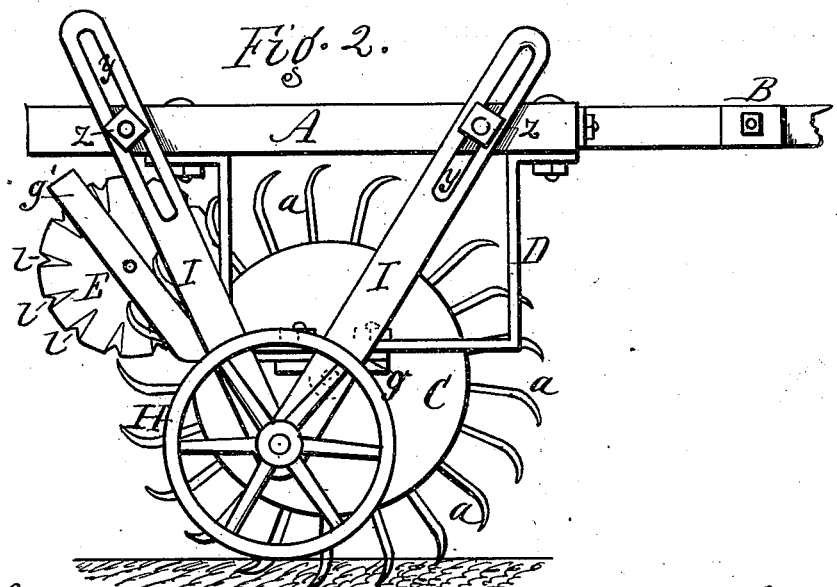
Witnesses.
Edwin Scott
Richard E. White
Inventor.
Louis Martin
pr R. F. Osgood
Atty.

L. MARTIN.
MACHINE FOR EXTERMINATING NOXIOUS GRASSES.
No. 186,684. Patented Jan. 30, 1877.
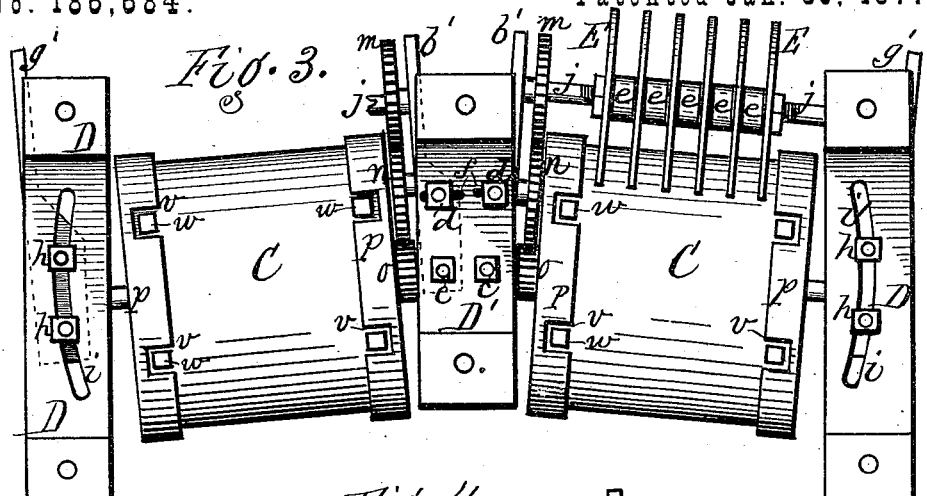
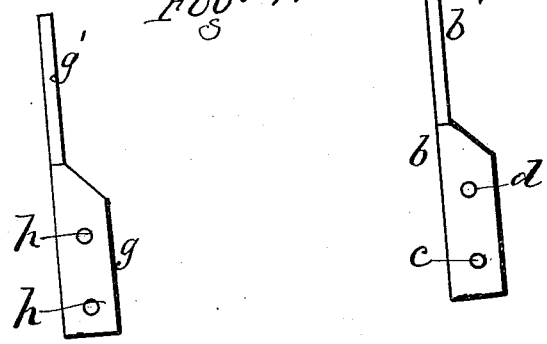
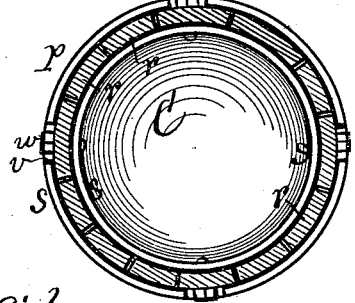
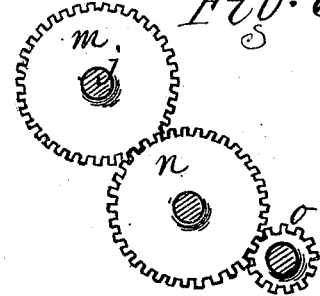
Witnesses.
Edwin Scott
Richard E. White
Inventor.
Louis Martin,
pr R. F. Osgood,
Atty.

UNITED STATES PATENT OFFICE.

LOUIS MARTIN, OF LYONS, NEW YORK.

IMPROVEMENT IN MACHINES FOR EXTERMINATING NOXIOUS GRASSES.

Specification forming part of Letters Patent No. 186,684, dated January 30, 1877; application filed November 3, 1876.

*To all whom it may concern:*

Be it known that I, LOUIS MARTIN, of Lyons, in the county of Wayne and State of New York, have invented a certain new and useful Improvement in Machines for Exterminating Noxious Grasses; and I do hereby declare that the following is a full, clear, and exact description of the construction and operation of the same, reference being had to the accompanying drawings, in which—

Figure 1 is a plan of the machine. Fig. 2 is an end elevation. Fig. 3 is a plan of the machine with the frame removed from place. Figs. 4, 5, and 6 are detail views.

My improvement relates to a machine for exterminating noxious grasses.

The invention consists in the construction and arrangement of parts hereinafter more fully described and definitely claimed.

A is a rectangular frame, to one side of which is attached the draft-pole B. C C are two rollers, which carry radial teeth $a\ a$. These teeth strike into the soil and pull up the grass by the roots. I prefer to make the teeth hooking backward from the line of motion; but they may be made effective if straight. D D are the end bearings of the rollers, and D' is the center bearing. These bearings are straps or loops of iron, which are bent to proper form, and are bolted to the under side of the frame. The inner end of each roller-shaft rests in a box, $b$, which is secured by a pivot-bolt, $c$, at one end to the bearing D', while the other end has a similar bolt, $d$, which passes through a cross-slot, $f$, of the said bearing. This allows the box to turn upon the pivot $c$, and be clamped by the bolt $d$ at any adjustment. The outer end of the roller-shaft rests in a similar box, $g$. This box is secured by bolts $h\ h$, which slide in a slot, $i$, of the end bearing D, concentric with the pivot $c$. By this means the rollers may be set at any angle, as shown in Fig. 1, in which position they are more effective in pulling the grass than when standing straight, since the teeth do not revolve in the line of draft, but at an angle thereto, and have a tearing effect upon the soil, removing the roots of the grass very thoroughly. The angle of the rollers can be adjusted by means of the arrangement above described, as necessity may require. The screw-bolts $h\ h$, in addition to serving as guides to the boxes $g\ g$, running in the slots $i\ i$, serve to clamp the boxes to the bearings at any adjustment, thereby securing the rollers in place. $b'\ b'$ and $g'\ g'$ are arms, which form extensions of the boxes $b\ b$ and $g\ g$. These arms form the bearings for the clearers E E, whose shaft $j$ rests therein, and also for the gearing. Therefore, as the rollers are adjusted, the clearers and gearing will be adjusted with them and always retain the same relative position. The clearers consist of round disks of metal interposed between the teeth of the rollers, and reaching nearly to the periphery of the rollers. They are separated on their shafts by elastic packings $e\ e$, which allow them to yield laterally, thereby preventing clogging or the breaking of the parts by the gathering of the material beween them and the teeth. They revolve in the opposite direction from the rollers, and catching the grass which is drawn up by the rollers, they throw it off at the rear entirely free of dirt. The edges of the disks are provided with open notches $l\ l$, at intervals, and these notches, on one side of the disks, have elongations, which extend in some distance toward the center of the disks, but do not cut through the disks. The notches $l\ l$ are so spaced relative to the teeth and the gearing that they coincide with the teeth in their revolutions, thereby catching the grass from the teeth more effectively than if they were arranged indiscriminately. The open notches act like saw-teeth in taking a positive hold of the grass, while the elongations of the notches on the side of the disks strike upon the grass, and work it up to the open notches without taking too rank a hold, which might clog and obstruct the clearers. To make this arrangement effective, I design to make the clearing-disks of considerable thickness transversely at the periphery.

$m$ is a spur-gear on the shaft $j$ of the clearers. $n$ is an intermediate gear, having its bearing on the arm $b'$, and $o$ is a pinion on the inner end of the roller-shaft. These gears all mesh together, and it will be seen that as they are adjustable with the roller and the clearers, they always remain in engagement and impart proper motion to the clearers at any adjustment. Each of the rollers C consists of two metallic heads, $p\ p$, and wooden slats $r\ r$, which form the body of the rollers. The heads $p$ have two rims or flanges, $s\ s$, projecting inward, with just space enough between them to receive the ends of the slats. The inner rim is entire and without break, but the outer rim has openings or notches $v\ v$, at intervals, as shown. These openings admit the ends of the slats, one by one, which are then pushed around in the annular space between the rims, and are retained by the rims alone. The ends of the slats which rest permanently in the openings, when all the slats are in place, are held by headed screws $w\ w$, which are screwed down through the slats into the lower rim.

The openings or notches above described not only admit the slats and retain them between the flanges, but, by being arranged at short intervals apart, they enable broken slats to be replaced by removing two or three slats, instead of removing all the slats of the rollers, as would be necessary if but one notch were made. The teeth $a\ a$ are made shouldered or beveled where they enter the slats, and have screw-stems, which are secured by nuts on the inner side of the slats. H H are supporting-wheels on opposite sides of the machine. I I are V-shaped arms, which hold the wheels. The upper ends of the arms are slotted, as shown at $y\ y$, and through the slots pass screw-bolts $z\ z$, which enter the main frame A. The lower ends of the arms are pivoted or jointed separately to the journals of the wheel, so as to allow an adjustment of the wheels in either direction, forward or back.

The particular advantage of the V-shaped arms is, that they can be adjusted on their holding-screws, so as to throw the wheels H H either forward or back of the center of the machine, thereby increasing or lessening the downward pressure upon the draft-pole in action. This is desirable to adapt the draft to the resistance, which varies in different kinds of work and on different soils. A simple vertical adjustment of the supporting-wheels would not produce this effect. They are also adjustable to raise the wheels or lower them vertically.

Having thus described my invention, what I claim as new is—

1. In a machine for exterminating noxious grasses, the combination of the toothed rollers C C and notched clearers E E, connected by the gears $o\ n\ m$, and attached to swinging boxes, so as to be adjusted bodily to different positions, as herein shown and described, and for the purpose specified.

2. The combination, with the toothed rollers C C and notched clearers E E, connected by the gears $o\ n\ m$, of the swinging boxes $b$ and $g$, capable of adjustment to different angles, carrying the said rollers and clearers bodily, and secured at any position by clamping-bolts, as shown and described, and for the purpose specified.

In witness whereof I have hereunto signed my name in the presence of two subscribing witnesses.

LOUIS MARTIN.

Witnesses:
R. F. OSGOOD,
EDWIN SCOTT.